(12) United States Patent
Fielhauer et al.

(10) Patent No.: US 7,206,575 B1
(45) Date of Patent: Apr. 17, 2007

(54) METHOD OF REMOTELY ESTIMATING A REST OR BEST LOCK FREQUENCY OF A LOCAL STATION RECEIVER USING TELEMETRY

(75) Inventors: Karl B. Fielhauer, Clarksville, MD (US); James R. Jensen, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 453 days.

(21) Appl. No.: 10/735,580

(22) Filed: Dec. 12, 2003

Related U.S. Application Data (60) Provisional application No. 60/434,259, filed on Dec. 18, 2002.

(51) Int. Cl.
  *H04Q 7/20* (2006.01)
  *H04B 7/19* (2006.01)
  *H01S 13/08* (2006.01)

(52) U.S. Cl. ............ 455/427; 455/431; 455/13.1; 342/104

(58) Field of Classification Search ............ 455/26.1, 455/502, 427, 429, 431, 13.1; 342/173, 174, 342/104
  See application file for complete search history.

(56) References Cited

U.S. PATENT DOCUMENTS

| | | | |
|---|---|---|---|
| 3,740,671 A | 6/1973 | Crow et al. | |
| 3,860,921 A | 1/1975 | Wood | |
| 4,001,690 A | 1/1977 | Mack et al. | |
| 4,060,809 A | 11/1977 | Baghdady | |
| 4,689,806 A | 8/1987 | Van Der Embse | |
| 4,785,463 A | 11/1988 | Janc et al. | |
| 4,901,368 A | 2/1990 | Arnold et al. | |
| 5,063,387 A | 11/1991 | Mower | |
| 5,187,805 A | 2/1993 | Bertiger et al. | |
| 5,414,431 A | 5/1995 | McCoskey | |
| 5,432,521 A * | 7/1995 | Siwiak et al. | 342/352 |
| 5,463,656 A * | 10/1995 | Polivka et al. | 375/130 |
| 5,594,454 A | 1/1997 | Devereux et al. | |
| 5,644,572 A | 7/1997 | Olds et al. | |
| 5,666,108 A | 9/1997 | Duffy | |
| 5,745,072 A * | 4/1998 | Jensen et al. | 342/104 |
| 5,995,039 A * | 11/1999 | Jensen et al. | 342/104 |
| 6,058,147 A * | 5/2000 | Eklof et al. | 375/344 |
| 6,563,893 B2 * | 5/2003 | Smith et al. | 375/354 |
| 6,650,279 B2 | 11/2003 | Jensen et al. | |

OTHER PUBLICATIONS

IEEE Transactions on Aerospace Andelectronic System vol. 35 No. 3 Jul. 1999 , Jensen et al.*
The CONTOUR Radio Communications System, 2001 IEEE Aerospace Conference Proceedings, Big Sky, Montana USA Mar. 10-17, 2001, pp. 1/81-91 vol. 1.

(Continued)

*Primary Examiner*—Tilahun Gesesse
(74) *Attorney, Agent, or Firm*—Albert J. Fasulo, II

(57) ABSTRACT

A system includes a remote station and a local station having a receiver. The receiver operates in an unlocked state corresponding to its best lock frequency (BLF). The local station derives data indicative of a ratio of the BLF to a reference frequency of the receiver, and telemeters the data to the remote station. The remote station estimates the BLF based on (i) the telemetered data, and (ii) a predetermined estimate of the reference frequency.

14 Claims, 7 Drawing Sheets

OTHER PUBLICATIONS

Experimental Verification of Noncoherent Doppler Tracking at the Deep Space Network, Jensen et al., IEEE Transactions on Aerospace and Electronic Systems, Oct. 2000, IEEE USA vol. 36, No. 4, pp. 1401-1406.

Accurate Doppler Navigation with A Simple Spacecraft Transceiver, Jensen et al., IEEE Aerospace Conference, 1999 Proceedings 1999 IEEE Mar. 6-13, 1999, pp. 245-254, vol. 2.

Highly Accurate, Noncoherent Technique for Spacecraft Doppler Tracking, Jensen et al., IEEE Transactions on Aerospace and Electronic Systems, vol. 35, No. 3 Jul. 1999.

Starprobe: Coronal Plasma Turbulence Effects on Tracking and Telemetry, Armstrong et al., AIAA Paper 82-0044, American Institute of Aeronautics and Astronautics, Aerospace Sciences Meetings, 20th, Orlando, FL Jan. 11-14, 1982.

* cited by examiner

METHOD OF REMOTELY ESTIMATING A REST OR BEST LOCK FREQUENCY OF A LOCAL STATION RECEIVER USING TELEMETRY

CROSS REFERENCE TO RELATED APPLICATIONS

This application claims the benefit U.S. Provisional Application No. 60/434,259, filed on Dec. 18, 2002, the contents of which are incorporated herein by reference in their entirety.

STATEMENT OF GOVERNMENTAL INTEREST

This invention was made with Government support under Contract No. NAS5-97271 awarded by NASA. The Government has certain rights in the invention.

BACKGROUND OF THE INVENTION

1. Field of the Invention

The present invention relates generally to systems including a control station and a remote receiver, and more specifically, to such a system wherein the control station remotely monitors an operating frequency of the receiver using telemetry.

2. Discussion of the Related Art

In a typical satellite system, a ground station transmits an uplink signal to a satellite and the satellite transmits a downlink signal to the ground station. The satellite includes a receiver configured to phase and/or frequency track the uplink signal. That is, in the presence of the uplink signal, the receiver locks onto and tracks the uplink signal frequency (referred to as the uplink frequency) and/or phase. However, in the absence of the uplink signal, the receiver is unlocked, i.e., free-running, and thus settles to a rest frequency, also referred to as best lock frequency (BLF). The BLF corresponds to the uplink frequency that, if present, would cause the receiver to transition from the unlocked state to the locked state in a minimum amount of time and with a minimum amount of frequency pull-in. The BLF can be considered a natural frequency of the receiver.

The receiver may have a relatively narrow uplink frequency pull-in range typically encompassing the BLF. However, the BLF is typically uncertain, i.e., not precisely known. Thus, in a known technique for uplink frequency acquisition, the ground station sweeps the uplink frequency over a relatively wide frequency range anticipated to include the uncertain BLF. When the swept uplink frequency moves near to the BLF and is within the frequency pull-in range, the receiver captures or locks onto and tracks the uplink frequency, and is said to have acquired the uplink signal.

Causes of BLF uncertainty include, for example, receiver temperature variations and component (e.g., oscillator) aging, or other physical effects. The larger the BLF uncertainty, the larger the uplink frequency sweep range, and disadvantageously, the larger the uplink signal acquisition time. It is desirable to minimize or eliminate the BLF uncertainty, and correspondingly narrow the uplink signal sweep range, so as to minimize the uplink signal acquisition time. Therefore, it would be advantageous to be able to accurately determine the BLF at the ground station. In other words, it would be advantageous to be able to monitor at the ground station the BLF of the spacecraft receiver.

After the uplink frequency is acquired, the ground station performs two-way Doppler tracking of the uplink and downlink signals (i.e., frequencies). The accuracy of the Doppler tracking depends on an accuracy with which the ground station can determine the uplink frequency as received at the satellite. Thus, there is a need to be able to accurately determine at the ground station the uplink frequency as received at the satellite. In other words, there is a need to monitor at the ground station the uplink frequency at the satellite.

These and other embodiments of the present invention will become apparent from the ensuing description.

SUMMARY OF THE INVENTION

An embodiment of the present invention includes a method of remotely monitoring a BLF of a local receiver.

Another embodiment of the present invention includes a method of remotely monitoring an uplink frequency received at a local station.

A system in which the embodiments may operate includes a remote station, such as a ground station, and a local station, such as a spacecraft. The local station includes a receiver having first and second digital counters. The first counter is clocked at a relatively low rate related to a down-converted and scaled frequency that is input to the receiver, which may represent either (i) the BLF of the receiver in the absence of an uplink frequency, or (ii) an uplink frequency input to the receiver when the uplink signal is present. The second counter is clocked at a high rate related to a frequency of a local reference frequency of the receiver.

The receiver includes latch logic configured to simultaneously latch first and second counter output values of the first and second counters, respectively, responsive to a trigger signal in the receiver. The latch logic operates repeatedly to generate successive pairs of first and second counter values. The successive pairs of counter values are indicative of a ratio of either (i) the uplink frequency, or (ii) the BLF, to the reference frequency.

The local station telemeters the successive pairs of counter values to the remote station. The remote station determines either (i) the uplink frequency, or (ii) the BLF, based on the successive pairs of telemetered counter values and a predetermined estimate of the reference frequency available at the remote station.

In the absence of the uplink signal, the present invention enables a user at the remote station (e.g., ground station) to remotely determine the BLF of the receiver. The BLF represents the frequency that, if injected into the input of the receiver, will place the least stress on an uplink signal tracking system in the receiver and permit the tracking system to quickly establish receiver lock using an efficient frequency sweep strategy. This advantageously improves the use of costly ground station time.

In the presence of the uplink signal, the present invention enables the user at the ground station to remotely determine the uplink frequency at the receiver, to maintain the uplink frequency at a desired frequency in the presence of Doppler shifts, and roughly estimate the Doppler velocity without the use of a ground-based Doppler measurement.

In another application, the ground station combines the telemetered successive counter values with a telemetered phase-locked loop static phase error (produced by the receiver tracking system) in order to monitor variations in the BLF over time. This allows the ground station to maintain the uplink frequency near the BLF and to ascertain what uplink frequency will quickly lock-up the receiver if the uplink signal link, between the ground station and spacecraft, is broken and must be re-established.

BRIEF DESCRIPTION OF THE DRAWINGS

The above and other features and advantages will become more readily apparent from the detailed description of the invention accompanied by the following drawings, in which.

DETAILED DESCRIPTION OF THE PREFERRED EMBODIMENTS

Definition

The term "receiver frequency" used herein denotes a frequency $f_u$ at which a receiver operates, and can mean either (i) an uplink frequency when an uplink frequency is present and the receiver is in the locked state, or alternatively, (ii) a rest frequency or BLF of the receiver when the receiver is unlocked, e.g., when the uplink frequency is not present.

System

Figure 1:
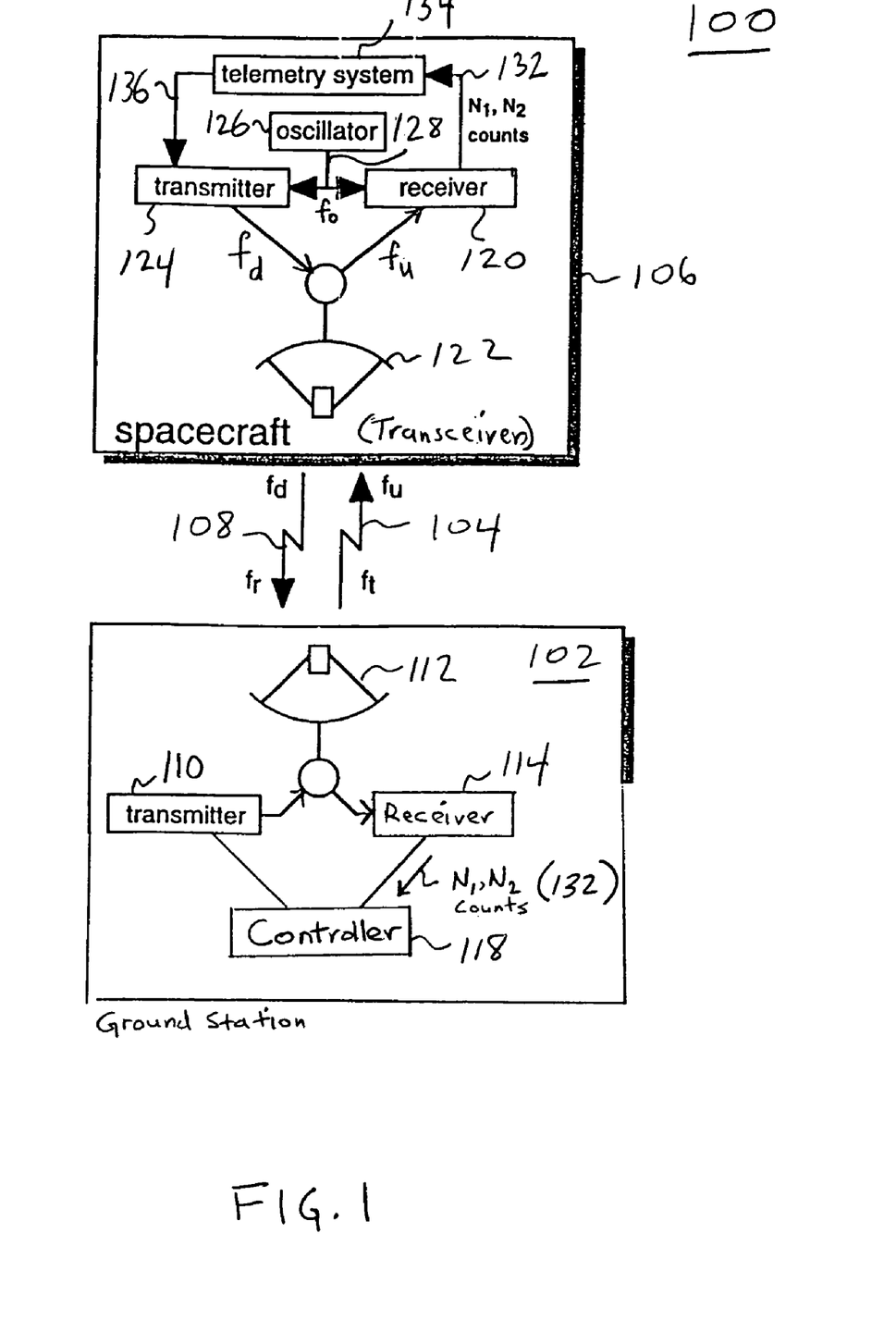
FIG. 1 is a block diagram of an example system in which the present invention can operate.

FIG. 1 is a block diagram of an example system 100 in which the present invention can operate. In a first operational arrangement of system 100, depicted in FIG. 1, a ground station 102 transmits an uplink signal 104 to a spacecraft 106, such as a satellite, for example. Spacecraft 106 transmits a downlink signal 108 to ground station 102. Relative motion between ground station 102 and spacecraft 106 will typically cause Doppler shifts in uplink signal 104 and downlink signal 108, as would be apparent to one having ordinary skill in the relevant art(s). Thus, uplink signal 104 has a frequency $f_t$ at ground station 102 and a Doppler shifted frequency $f_u$ at spacecraft 106, while downlink signal 108 has a frequency $f_d$ at spacecraft 106 and a Doppler shifted frequency $f_r$ at ground station 102. Spacecraft 106 may trace a trajectory relative to ground station 102 such that the uplink signal 104 and downlink signals 108 experience no Doppler shift, i.e., frequency $f_t$=frequency $f_u$, and frequency $f_d$=frequency $f_r$. In an X-band uplink and X-band downlink system, for example, $f_t$ might be 7.18185 GigaHertz (GHz) and $f_d$ might be 8.4380 GHz, although any combination of radio frequencies might be used.

Ground station 102 includes a transmitter 110 for transmitting uplink signal 108 through an antenna 112. Ground station 102 also includes a receiver 114 for receiving downlink signal 104 through antenna 112. A controller 118, coupled with transmitter 110 and receiver 114, controls ground station 102, and performs methods in accordance with the present invention, as will be described below.

Spacecraft 106 includes a receiver 120 for receiving uplink signal 104 through an antenna 122. A transmitter 124 transmits downlink signal 108 through antenna 122. Receiver 120 and transmitter 124 together represent a spacecraft transceiver. An oscillator 126 provides a reference signal 128, having a reference frequency $f_o$, to both receiver 120 and transmitter 124. The arrangement of spacecraft 106 depicted in FIG. 1 is referred to as a transceiver configuration. In the transceiver configuration, transmitter 124 derives downlink signal 108 independent of the phase and frequency of uplink signal 104.

In the presence of uplink signal 104, receiver 120 operates in a locked state, wherein the receiver tracks uplink frequency $f_u$. Receiver 120 generates a count signal 132, including count values N1 and N2, indicative of a ratio of uplink frequency $f_u$ to reference frequency $f_o$ (i.e., $f_u/f_o$), and provides count signal 132 to a telemetry system 134. Telemetry system 134 encodes count signal 132 into a telemetry stream 136. Transmitter 124 transmits telemetry stream 136 to ground station 102 through downlink signal 108. Receiver 114 of ground station 102 recovers count signal 132 from downlink signal 108 and passes the same to controller 118. Controller 118 determines, that is, estimates, uplink frequency $f_u$ based on count signal 132. In this manner, system 100 determines uplink frequency $f_u$ at spacecraft 106. While FIG. 1 shows the counts 132 to originate within the receiver, they may, in principle be generated within the transmitter or in any other subsystem where the necessary signals are present.

The first operational arrangement of system 100 described above assumes spacecraft receiver 120 operates in the presence of uplink signal 104. In a second operational arrangement, receiver 120 operates in the absence of uplink signal 104, that is, uplink signal 104 is not present. In the second arrangement, receiver 120 operates in an unlocked (i.e., free-running) state, and thus settles to a rest or best-lock frequency (BLF).

The BLF corresponds to the uplink signal frequency $f_u$ that, if present, would cause receiver 120 to transition from the unlocked state to the locked state in a minimum amount of time and with a minimum amount of frequency pull-in. For this reason, the term "frequency $f_u$" as used herein is synonymous with the term "receiver frequency" and denotes either (i) uplink frequency $f_u$ when the uplink signal 104 is present, or alternatively, (ii) the rest frequency or BLF of receiver 120 when the receiver is not locked to the uplink signal, e.g., when the uplink signal is not present. The receiver frequency is the frequency at which receiver 120 operates.

In the second operational arrangement (uplink signal not present), receiver 120 generates count signal 132 indicative of a ratio of the BLF to reference $f_o$. Spacecraft 106 transmits downlink signal 108 to ground station 102. Ground station 102 recovers count signal 132 and passes the count signal to controller 118. Controller 118 determines the BLF based on count signal 132.

Figure 2:
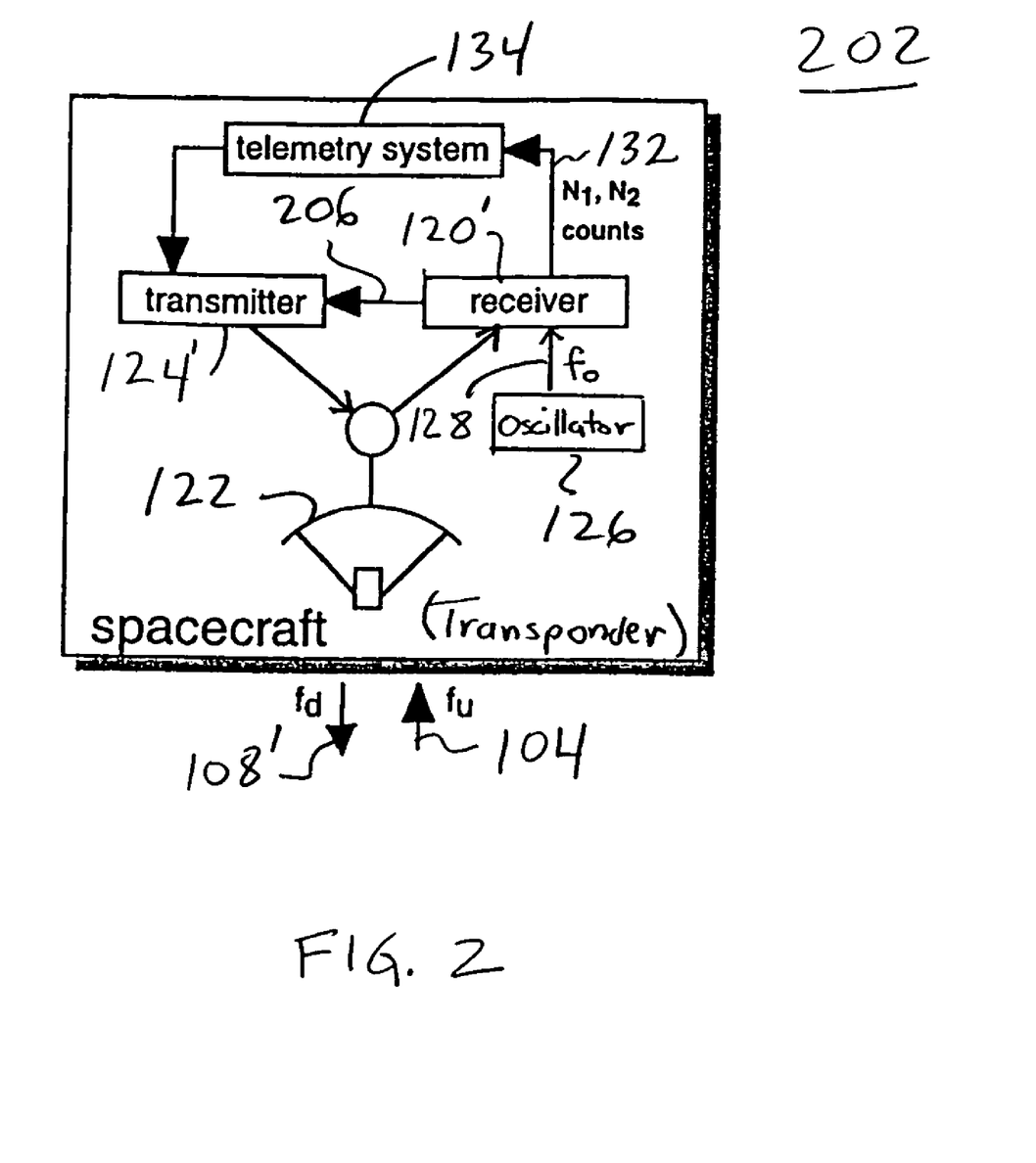
FIG. 2 is an example transponder configuration of a spacecraft depicted in FIG. 1.

FIG. 2 is an example transponder configuration 202 of spacecraft 106. In transponder configuration 202, oscillator 126 provides reference signal 128 to receiver 120' only. Receiver 120' produces a reference signal 206 that is phase and/or frequency locked to uplink signal 104, and provides reference signal 206 to transmitter 124'. Transmitter 124' generates downlink signal 108' such that it is also phase and/or frequency locked to reference signal 206, and thus uplink signal 104.

In addition to satellite systems, such as system 100, the present invention may be implemented a terrestrial system wherein ground station 102 and spacecraft 106 are replaced with a base station and a terrestrial mobile and/or fixed terminal, respectively. Such a base station may be arranged in either a transceiver configuration or a transponder configuration.

Figure 3:
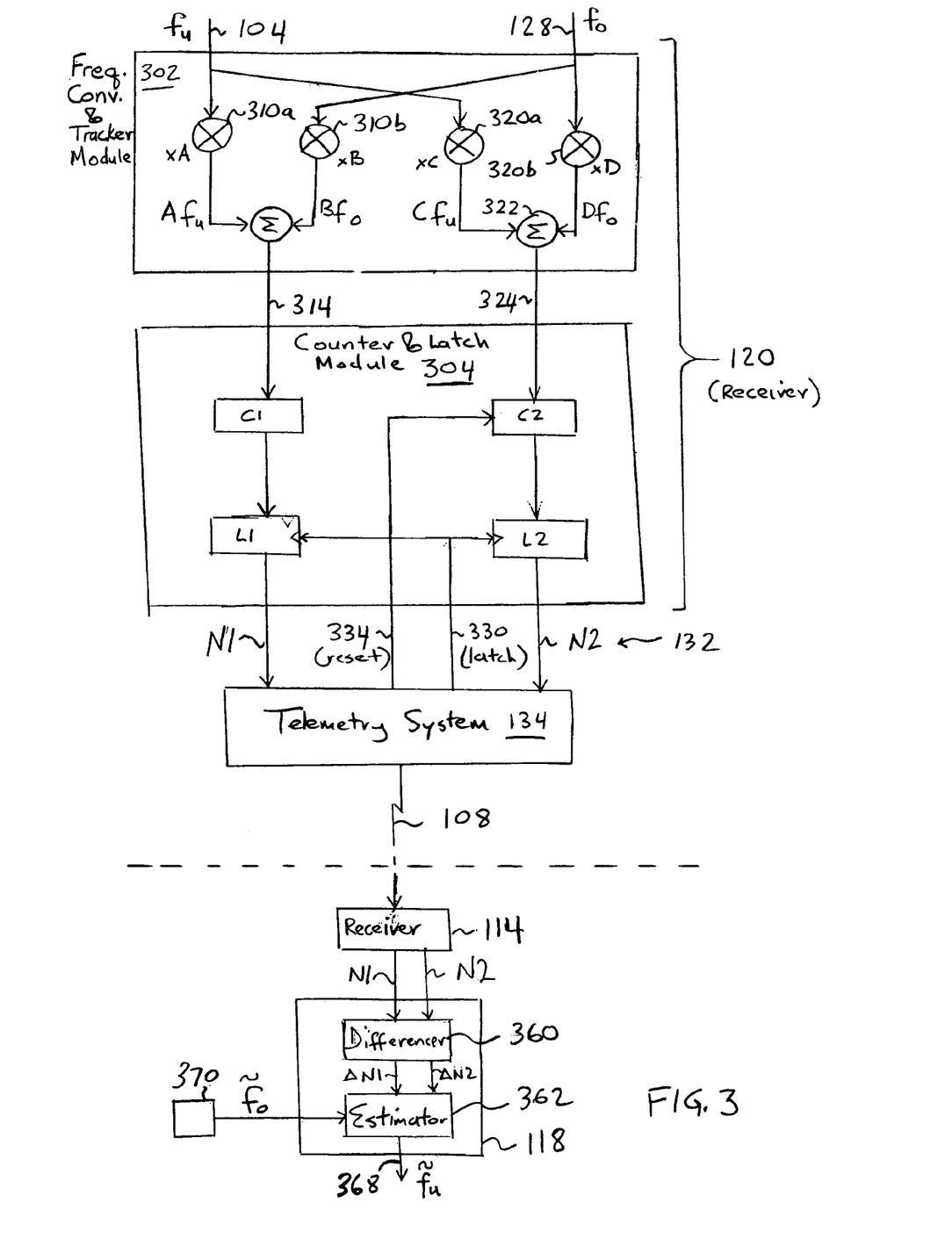
FIG. 3 is a block diagram of example portions of the spacecraft and a ground station depicted in FIG. 1, relevant to the present invention.

FIG. 3 is a block diagram of example portions of spacecraft 106 and ground station 102, relevant to both the first operational arrangement (uplink signal present) and the second operational arrangement (uplink signal not present) of present invention described above. As depicted in FIG. 3, spacecraft receiver 120 includes a Frequency Converter and Tracker module 302 coupled to a Counter and Latch module 304. Module 302 includes signal processing modules configured to (i) frequency down-convert uplink signal 104, and (ii) phase and/or frequency-lock to, i.e., track, uplink signal 104, when the uplink signal is present. In the absence of uplink signal 104, module 302 operates at the BLF of receiver 120.

Frequency Converter and Tracker module 302 includes parallel frequency multipliers 310a and 310b for frequency multiplying uplink/BLF frequency $f_u$ and $f_o$ by values A and B, respectively, to produce frequencies $A \cdot f_u$ and $B \cdot f_o$, respectively. Following parallel multipliers 310, a combiner 312 combines, e.g., adds or subtracts, the multiplied frequencies from multipliers 310, to produce a first linear combination signal 314 having a frequency equal to $A \cdot f_u + B \cdot f_o$, where B may be negative. In a similar manner, parallel frequency multipliers 320a and 320b, and a frequency combiner 322, operate on reference frequencies $f_o$ and $f_u$ to produce a second linear combination signal 324 having a frequency equal to $C \cdot f_u + D \cdot f_o$, where D may be negative. Values A,B are linearly independent of values C,D. As an example of these parameters, for an uplink frequency $f_u$, of 7.18185 GHz and a frequency reference $f_o$, of 30.6 MegaHertz (MHz), appropriate values of the parameters might be A=$\frac{1}{208}$, B=$\frac{44}{39}$, C=0, and D=1, resulting in signals 314 and 324 having frequencies of 5048 Hertz (Hz) and 30.6 MHz, respectively.

Telemetry system 134 generates a measurement trigger at a fixed, known time within each downlink telemetry frame. Telemetry system 134 uses the measurement trigger to (i) derive a reset signal 334, and (ii) enable a subsequent latch signal or pulse 330, which the telemetry system provides to Counter and Latch module 304. The measurement trigger may be derived from other sources, including commands telemetered from ground station 102 to spacecraft 106, fixed or scheduled timers, events local to spacecraft 106, and so on. The measurement triggers should occur frequently enough or on a known schedule so that there is little or no ambiguity in latched values N1, N2 due to counter roll-over in counters C1, C2. Measurement triggers that do not occur at fixed, known points within each telemetry frame enable subsequent latch signal 330 but do not provide reset signal 344. Once a latch in module 304 has been enabled (discussed below), latch signal 330 is asserted at a beginning of a next cycle of count signal 314.

Counter and Latch module 304 includes signal processing elements configured to produce count values N1,N2, of count signal 132, responsive to linear combination signals 314, 324, latch signal 330, and counter reset 334. Counter reset 334 resets counter C2 of module 320. Subsequently, counters C1, C2 count cycles of respective linear combination signals 314, 324. Latches L1, L2 of module 320 simultaneously latch respective count values or counts N1, N2 of counters C1, C2 responsive to latch enable 330, and provide the count values to telemetry system 134. Telemetry system 134 downlinks count values N1, N2 to receiver 114 of ground station 102, via downlink signal 108. In an embodiment, counters C1, C2 and latches L1, L2 are implemented in digital logic, and count values N1, N2 are digital values. Additional embodiments and/or details directed to generating count values N1, N2 on a spacecraft are given in the following U.S. Patents, which are incorporated by reference herein in their entireties: U.S. Pat. Nos. 5,995,039; 5,745,072; and 6,650,279.

Receiver 114 derives count values N1, N2 from downlink signal 108 and provides such values to controller 118 of ground station 102. Controller 118 produces an estimate 368 ($\hat{f}_u$) of uplink frequency $f_u$, or alternatively, BLF $f_u$, based on recovered count values N1, N2 and an predetermined estimate $\hat{f}_o$ of reference frequency $f_o$. Predetermined estimate $\hat{f}_o$ may be stored, for example, in a memory module 370 accessible by controller 118.

The above-described operations repeat continuously over time to produce a series of recovered count values N1, N2 and corresponding frequency estimates $\hat{f}_u$. In an embodiment, controller 118 includes a differencer module 360 configured to (i) subtract successive values of N1 from each other to produce count difference values ΔN1, and (ii) subtract successive values of N2 from each other to produce count difference values ΔN2. This subtraction process accounts for the fact that one or both of counters C1, C2 may have "rolled over" (gone from a maximum count to zero) between latched values as a result of a limited number of bits in counters C1, C2. This process of "unrolling" counters C1, C2 can be performed on the basis of known information about the frequencies of linear combination signals 314 and 324 and a relationship of these signals to the timing of the telemetry frames. After the above-described differencing and unrolling is completed, an estimator 362 determines estimate $\hat{f}_u$ based on count differences ΔN1, ΔN2 and predetermined reference frequency $\hat{f}_o$.

Figure 3A:
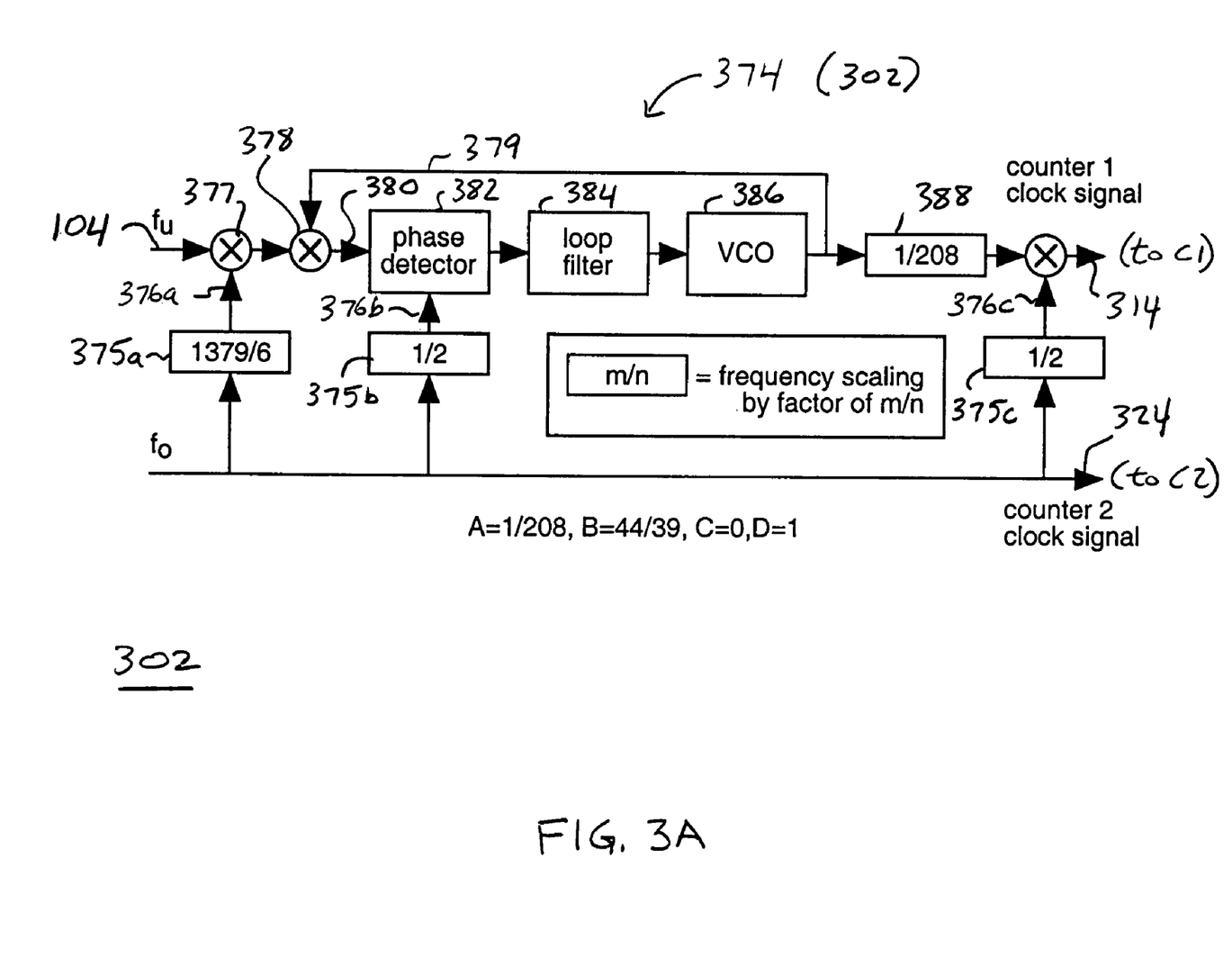
FIG. 3A is a block diagram of an example arrangement of a Frequency Converter and Tracker module of FIG. 3.

FIG. 3A is a block diagram of an example arrangement 374 of Frequency Converter and Tracker module 302 of FIG. 3. Arrangement 374 includes dividers 375a–c to divide reference frequency $f_o$, and thereby produce respective frequency divided reference signals 376a–c. Successive frequency down-converters or mixers 377 and 378 frequency down-convert uplink frequency $f_u$ to a signal 380 (frequency $f_{dc}$), responsive to (i) signal 376a, and (ii) a feedback signal 379. A phase and/or frequency detector 382, a loop filter 384 and a Voltage Controlled Oscillator (VCO) 386 operate together as a phase and/or frequency tracking loop for tracking signal 380. VCO generates feedback signal 379. A divider 388 and subsequent mixer 390 operate on VCO output 379 to produce signal 314.

When uplink signal 104 is present, the tracking loop tracks signal 380, i.e., is locked to signal 380, and thus receiver 120 operates in its locked state. In contrast, when uplink signal 104 is not present, the tracking loop is free-running, and thus receiver 120 operates in its unlocked state. In this condition, the tracking loop settles to a rest frequency, that is, the tracking loop will cause VCO 386 to oscillate at its rest frequency. Given the architecture depicted in FIG. 3A, the rest frequency of the tracking loop implies, i.e., corresponds to, an uplink frequency $f_u$ referred to herein as the BLF, as would be apparent to one of ordinary skill in the relevant art(s) given the present description.

Method Flow Charts

Methods of remotely monitoring (i.e., determining or estimating) a local receiver frequency that may be performed in system 100, for example, are now described in connection with FIGS. 4–6. In the methods, spacecraft 106 is considered a local station and ground station 102 is considered a remote station. Thus, ground station 102 remotely monitors the frequency at which local receiver 120 operates. That is, ground station 102 remotely monitors receiver frequency $f_u$ (the uplink frequency, or alternatively, the BLF). Each of the methods described below may be performed with both the transceiver (FIG. 1) and transponder (FIG. 2) configurations of spacecraft 106.

Remote Estimation of Local Receiver BLF

Figure 4:
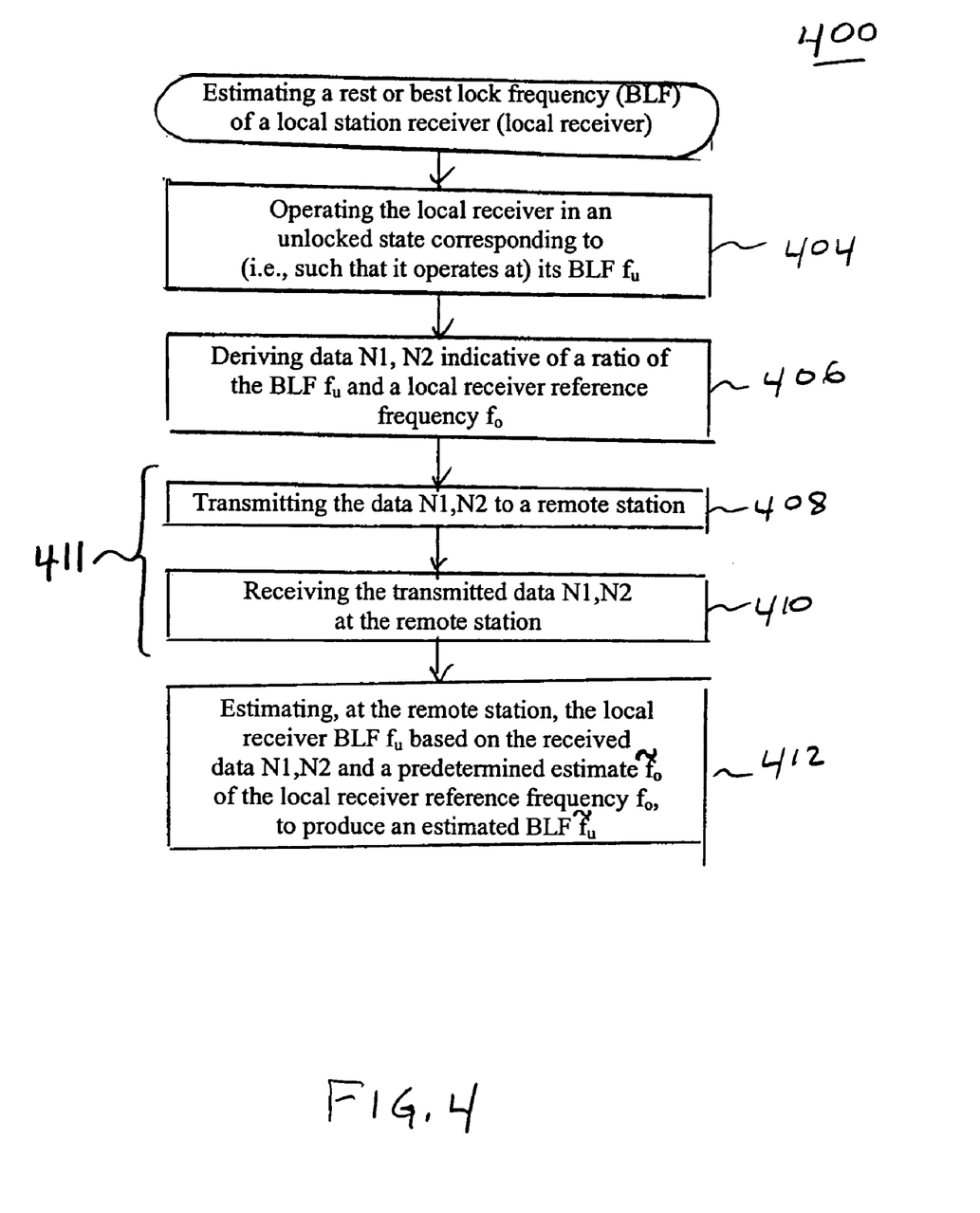
FIG. 4 is a flow chart of an example method of remotely estimating a rest or best lock frequency of a local station receiver, performed in the system of FIG. 1.

FIG. 4 is a flow chart of an example method 400 of remotely monitoring, i.e., estimating, rest or best lock frequency $f_u$ of local station receiver 120 (referred to as the local receiver), performed in the second operational arrangement of system 100.

In a first step 404, spacecraft receiver 120 operates in the absence of an uplink signal. Thus, receiver 120 operates in its unlocked state. That is, receiver 120 operates at its rest or BLF $f_u$.

In a next step 406, modules 302 and 304 of receiver 120 operate together to derive data, e.g., count values N1, N2, indicative of a ratio of BLF $f_u$ to reference frequency $f_o$. Step 406 includes the following further steps:

(i) telemetry system 134 generates counter reset 334 and latch signal 330;

(ii) Frequency Converter and Tracker module 302 produces linear combination signals 314, 324 from frequencies $f_u$, $f_o$; and (iii) Counter and Latch module 304 counts cycles of signals 314, 324 occurring between pulses of counter reset 334 and latch signal 330 (i.e., over an elapsed time period), to produce count values N1, N2 respectively.

Step 406 repeats to produce successive sets of corresponding count values N1, N2.

In a next step 408, spacecraft 106 transmits or downlinks data, i.e., count values N1, N2 (e.g., successive sets of count values N1,N2), to ground station 102.

In a next step 410, ground station 102 receives the data transmitted in step 408. Steps 408 and 410 collectively represent a step 411 of telemetering count values N1, N2 from spacecraft 106 to ground station 102.

In a next step 412, ground station receiver 114 recovers count values N1, N2 from signal and provides the same to controller 118. Controller 118 determines estimate $\hat{f}_u$ of BLF $f_u$ based on recovered count values N1, N2 and predetermined estimate $\hat{f}_o$ of receiver reference frequency $f_o$. In an embodiment, step 412 includes the following further steps:

(i) differencer module 360 subtracts successive values of N1 from each other to produce count difference values $\Delta$N1;

(ii) differencer module 360 subtracts successive values of N2, corresponding to the successive values of N1, from each other to produce count difference values $\Delta$N2; and (iii) estimator 362 determines frequency estimate $\hat{f}_u$ based on count differences $\Delta$N1, $\Delta$N2 and predetermined reference frequency $\hat{f}_o$.

Estimator 362 determines frequency estimate $\hat{f}_u$ in accordance with the following expression:

$$\hat{f}_u = \hat{f}_o(B-Dr)/(Cr-A),$$

where $r=\Delta N1/\Delta N2$.

In this manner, both ratio r (i.e., $\Delta$N1/$\Delta$N2) and the corresponding ratio N1/N2, are indicative of frequency $\hat{f}_u$.

Uplink Signal Acquisition

Figure 5:
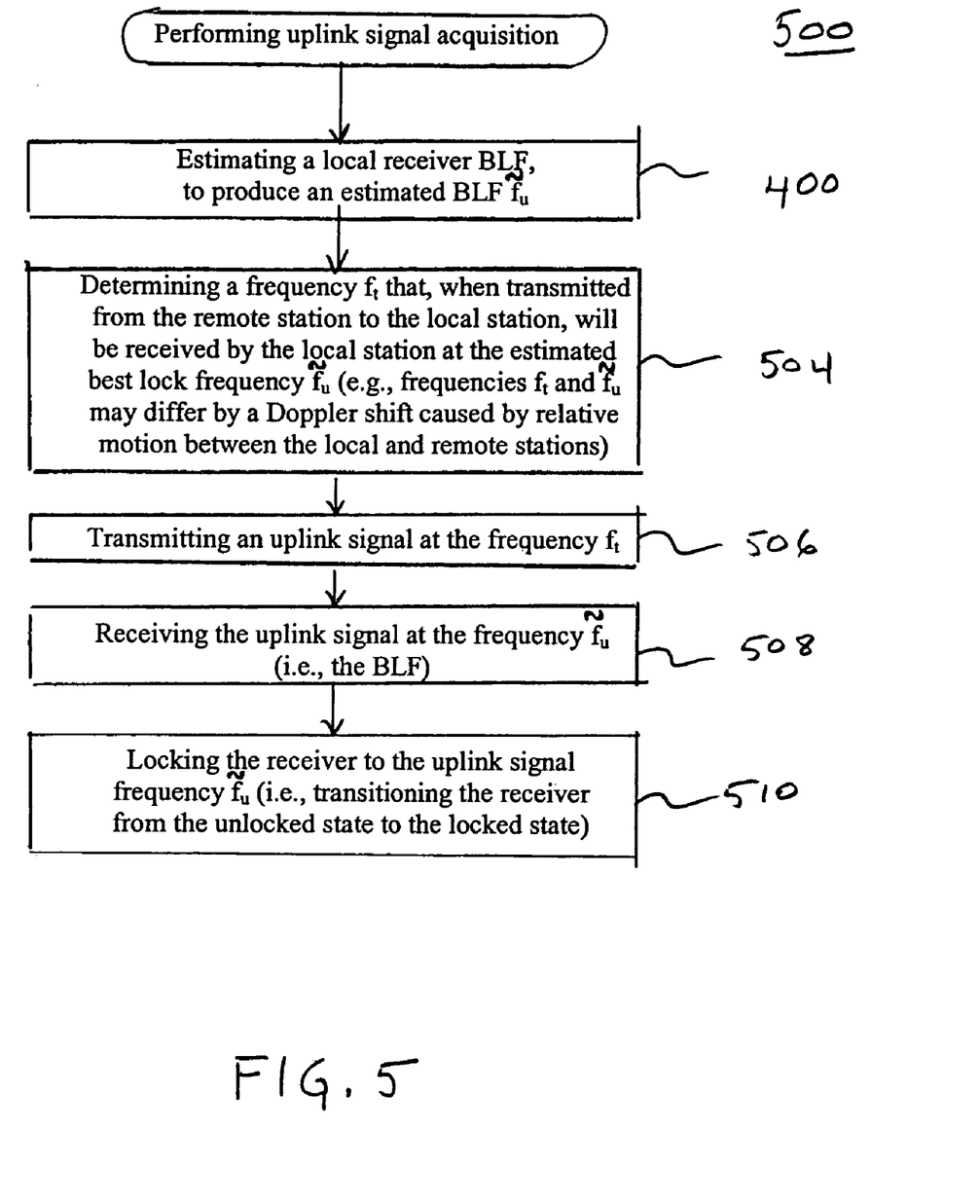
FIG. 5 is a flow chart of an example method of performing, in the system of FIG. 1, an uplink signal acquisition.

FIG. 5 is a flow chart of an example method 500 of performing an uplink signal acquisition, performed in system 100, for example.

First step 400, corresponding to method 400, is described above in connection with FIG. 4. First step 400 includes estimating BLF $f_u$ of receiver 120, to produce estimated BLF $\hat{f}_u$.

In a next step 504, controller 118 determines a frequency $f_t$ that, when transmitted from ground station 102 to spacecraft 106, will be received at spacecraft 106 at or at least near to estimated BLF $\hat{f}_u$, (e.g., frequencies $f_t$ and $f_u$ may differ by a Doppler shift or offset caused by relative motion between ground station 102 and spacecraft 106). Exemplary methods related to determining and tracking such a Doppler shift are given in U.S. Pat. Nos. 5,995,039, 5,745,072 and 6,650,279.

In a next step 506, ground station 102 transmits uplink signal 108 at the frequency $f_t$.

In a next step 508, spacecraft 106 receives uplink signal 108 at the Doppler-shifted frequency $\hat{f}_u$ (i.e., at the estimated BLF).

In a next step 510, receiver 120 captures and locks to the uplink signal frequency $\hat{f}_u$ (i.e., receiver 120 transitions from its unlocked state to its locked state).

Remote Estimation of Uplink Frequency at Local Receiver

Figure 6:
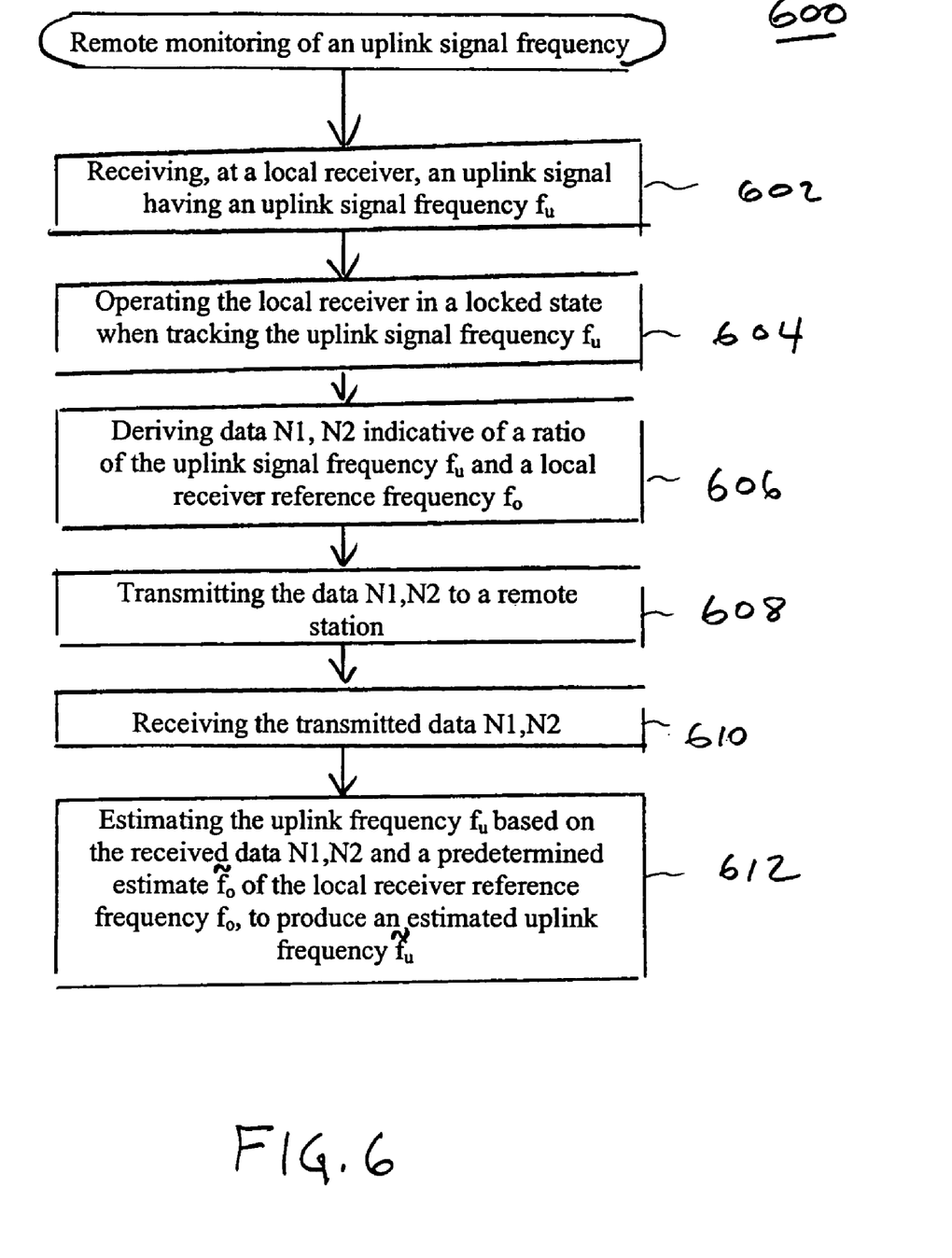
FIG. 6 is a flowchart of an example method of remotely monitoring an uplink signal frequency provided to a local station.

FIG. 6 is a flowchart of an example method 600 of remotely monitoring, i.e., estimating, uplink frequency $f_u$ provided to local station receiver 120, performed in the first operational arrangement of system 100. Method 600 enables ground station 102 to remotely monitor uplink frequency $f_u$ as received at spacecraft 108.

In a first step 602, spacecraft 106 receives and acquires uplink signal 108.

In a next step 604, receiver 120 operates in its locked state when tracking uplink signal frequency $f_u$.

In the next step 606, modules 302 and 304 of receiver 120 operate together to produce successive values of count values N1, N2 indicative of the ratio of uplink signal frequency $f_u$ to local receiver reference frequency $f_o$.

In a next step 608, spacecraft 106 transmits the successive values of count values N1, N2 to ground station 102.

In the next step 610, count values N1, N2 are received at ground station 102.

In a next step 612, ground station 102, that is, controller 118, estimates uplink frequency $f_u$ based on recovered count values N1, N2 and predetermined estimate $\hat{f}_o$, to produce estimated uplink frequency $\hat{f}_u$.

It will be understood that various modifications may be made to the embodiments disclosed herein. Therefore, the above description should not be construed as limiting the scope of the invention, but merely as exemplifications of the preferred embodiments. Those skilled in the art will envision other modifications within the scope and spirit of the claims appended hereto.

What is claimed is:

1. In a system including a local station and a remote station, the local station including a receiver capable of operating in an unlocked state when not tracking an uplink signal, the unlocked state corresponding to a best lock frequency (BLF) of the receiver, a method of remotely monitoring the BLF, comprising:

(a) in the local station, operating the receiver in the unlocked state corresponding to the BLF; concurrently (b) in the local station, deriving data indicative of a ratio of the BLF to a reference frequency of the receiver;

(c) telemetering the data indicative of the ratio from the local station to the remote station; and (d) in the remote station, estimating the BLF based on (i) the telemetered data indicative of the ratio, and (ii) a predetermined estimate of the reference frequency, to produce an estimated BLF wherein step (b) comprises: producing a first linear combination frequency as a first linear combination of the BLF and the reference frequency; producing a second linear combination frequency as a second linear combination of the BLF and the reference frequency; repeatedly counting cycles of the first linear combination frequency to produce successive first count values; and repeatedly counting cycles of the second linear combination frequency to produce successive second count values corresponding to the successive first count values, wherein the successive first and second count values represent the data indicative of the ratio.

2. The method of claim 1, further comprising:
(e) transmitting, from the remote station to the local station, an uplink signal having an uplink frequency that will be received at the local station at the estimated BLF; and
(f) in the local station, locking the receiver to the uplink frequency.

3. The method of claim 2, wherein the uplink frequency transmitted in step (e) is either:
(i) the estimated BLF, or
(ii) offset from the estimated BLF by an amount substantially equal to a Doppler shift arising from relative motion between the remote station and the local station.

4. The method of claim 1, wherein step (a) includes operating the receiver in the absence of an uplink signal.

5. The method of claim 1, wherein the BLF is the uplink frequency that, if received at the receiver, would cause the receiver to transition from the unlocked state to a locked state in a minimum amount of time.

6. The method of claim 1, wherein:
step (c) comprises telemetering the successive first and second count values from the local station to the ground station; and
step (d) comprises estimating the BLF based on (i) the telemetered successive first and second count values, and (ii) the predetermined estimate of the reference frequency, to produce the estimated uplink frequency.

7. The method of claim 6, wherein step (e) comprises:
subtracting the telemetered successive first count values from each other to produce a first difference value;
subtracting the telemetered successive second count values from each other to produce a second difference value corresponding to the first difference value; and
estimating the BLF based on the first and second difference values and the predetermined reference frequency estimate.

8. The method of claim 7, wherein:
the first linear combination frequency is equal to $A \cdot f_u + B \cdot f_o$;
the second linear combination frequency is equal to $C \cdot f_u + D \cdot f_o$; and
said estimated BLF ($\hat{f}_u$) is given by $\hat{f}_u = \hat{f}_o (B-Dr)/(Cr-A)$, where
$f_u$, $f_o$, and $\hat{f}_o$ respectively denote the BLF, the reference frequency and the predetermined reference frequency, and
r represents a ratio of the first difference value (ΔN1) to the second difference value (ΔN2).

9. The method of claim 1, wherein the local station is a spacecraft and the remote station is a ground station.

10. In a system including a local station and a remote station, the local station including a receiver, a method of remotely monitoring an uplink frequency of an uplink signal at the local station, comprising:
(a) in the local station, operating the receiver in the locked state when tracking the uplink frequency; concurrently
(b) in the local station, deriving data indicative of a ratio of the uplink frequency and a reference frequency of the receiver;
(c) telemetering the data indicative of the ratio from the local station to the remote station; and
(e) in the remote station, estimating the uplink frequency based on the telemetered data and a predetermined estimate of the reference frequency, to produce an estimated uplink frequency, wherein step (b) comprises:
producing a first linear combination frequency as a first linear combination of the uplink frequency and the reference frequency;
producing a second linear combination frequency as a second linear combination of the uplink frequency and the reference frequency;
repeatedly counting cycles of the first linear combination frequency to produce successive first count values; and
repeatedly counting cycles of the second linear combination frequency to produce successive second count values corresponding to the successive first count values, wherein the successive first and second count values represent the data indicative of the ratio.

11. The method of claim 10, wherein:
step (c) comprises telemetering the successive first and second count values from the local station to the ground station; and
step (d) comprises estimating the uplink frequency based on (i) the telemetered successive first and second count values, and (ii) the predetermined estimate of the reference frequency, to produce the estimated uplink frequency.

12. The method of claim 11, wherein step (e) comprises:
subtracting the telemetered successive first count values from each other to produce a first difference value;
subtracting the telemetered successive second count values from each other to produce a second difference value corresponding to the first difference value; and
estimating the uplink frequency based on the first and second difference values and the predetermined reference frequency estimate.

13. The method of claim 12, wherein:
the first linear combination frequency is equal to $A \cdot f_u + B \cdot f_o$;
the second linear combination frequency is equal to $C \cdot f_u + D \cdot f_o$; and
said estimated uplink frequency ($\hat{f}_u$) is given by $\hat{f}_u = \hat{f}_o (B-Dr)/(Cr-A)$, where
$f_u$, $f_o$, and $\hat{f}_o$ respectively denote the uplink frequency, the reference frequency and the predetermined reference frequency, and
r represents a ratio of the first difference value (ΔN1) to the second difference value (ΔN2).

14. The method of claim 1, wherein the local station is a spacecraft and the remote station is a ground station.

* * * * *